Jan. 24, 1967     W. BATTENFELD ETAL     3,300,556
METHOD OF PRODUCING HOLLOW BODIES IN A BLOWING PROCESS
Filed July 7, 1964     2 Sheets-Sheet 1
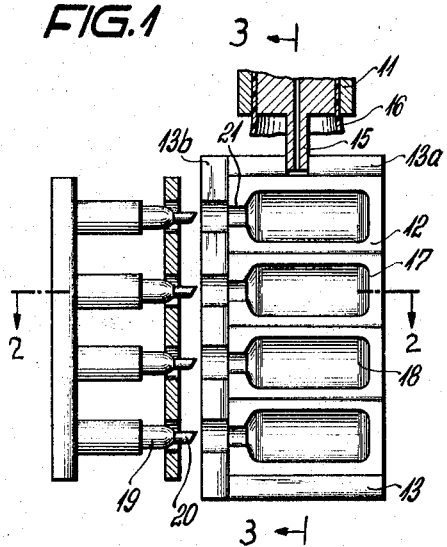
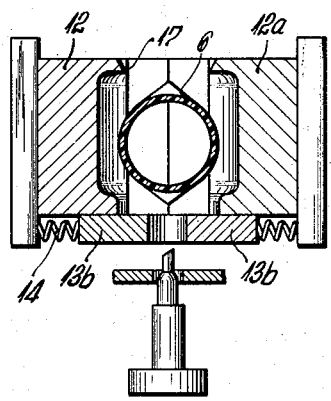
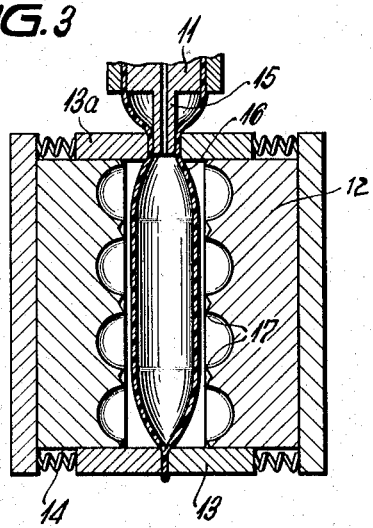
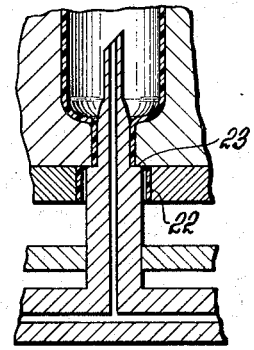
INVENTORS
Werner Battenfeld
Erhard Langecker Jan. 24, 1967  W. BATTENFELD ETAL  3,300,556
METHOD OF PRODUCING HOLLOW BODIES IN A BLOWING PROCESS
Filed July 7, 1964  2 Sheets-Sheet 2

INVENTORS

United States Patent Office 3,300,556
Patented Jan. 24, 1967

3,300,556
METHOD OF PRODUCING HOLLOW BODIES
IN A BLOWING PROCESS
Werner Battenfeld, Lindenstrasse, and Erhard Langecker,
Hohbuschener Weg, both of Meinerzhagen, Germany
Filed July 7, 1964, Ser. No. 380,774
Claims priority, application Germany, July 8, 1963,
B 72,591
1 Claim. (Cl. 264—98)

The present invention relates to a method of producing hollow bodies, such as bottles, ampullae, canisters, tube fittings, or the like, in a blowing process from, preferably, hose-shaped starting products, whereby the axis of the hose-shaped starting product deviates from the axis and the axes, respectively, of the opening or openings of the hollow body and hollow bodies, respectively.

Until now two plastic bands disposed parallel to each other have been used, which are arranged with their wide faces opposite each other. The bands are guided with their longitudinal edges along the blow nozzles of the pressure medium and are sealed about the blowing nozzle during the closing of the mold-half, for the production of the above-mentioned parts. Upon injection of the pressure medium, the bands are blown up to the hollow bodies. Instead of these bands, a U-shaped band also has been used. In this case, the air feed takes place through the blowing nozzles from one side only. These blowing nozzles can have a diameter merely equal to the length of the band, so that the openings of the hollow body are disposed crosswise to the extrusion direction of the band, which is not possible until now in connection with hose-like starting products.

In case of the use of hose-like starting products the blowing up of the hose-like starting product takes place partly from the side by insertion of a hollow needle, which, however, merely pierces the hose wall and in particular with a comparatively small diameter, depending upon the size of the part and the wall thickness of the hose-shaped starting product, up to about 6 mm., whereby, however, never simultaneously a deformation of the hose-shaped starting product takes place at this point to a bottle-neck-like part.

These known methods have, however, the drawback, that the bands adhere easily to each other during the closing of the mold and the blowing up is prevented. Also, a U-shaped band or two smooth bands are more difficult to produce than a hose-like starting product.

It is, therefore, one object of the present invention to provide a method of producing hollow bodies in a blowing process, which starts out with a hose. It is essential, that the bottle-neck-shaped opening is formed directly into the hose-wall or also into the wall of a band.

It is another object of the present invention to provide a method of producing hollow bodies in a blowing process, wherein in a first step the hose-shaped starting product is sealed off and is blown up to form an intermediate hollow body within a hollow mold before the latter is completely closed and wherein in a second following step the mold is then completely closed and the partly blown up intermediate body is pierced from the side crosswise to the longitudinal axis of the hose, by means of a calibrated pin feeding blowing air, whereupon the hose material is blown up, on the one hand, to a finished hollow body and, on the other hand, by means of the entering blowing air is displaced outwardly by the pressure above atmospheric pressure within the range of the piercing point and is widened beyond the enlarging calibrated pin and, thereby, calibrating the created enlarged neck opening.

The practical performance of the method according to the present invention brings about the decisive advantage, that the wall parts of the starting product cannot adhere to each other as they did in the prior methods. This is accomplished by the formation of an intermediate hollow body partly blown up by the preliminary blowing nozzle. A reliable, as well as completely friction-free working can now be performed, even when the starting material is not the preferred hose-material, as for example where the starting material is a U-shaped band or two individual bands.

It is still another object of the present invention to provide a method of producing hollow bodies in a blowing process wherein, for example, for the sealing of the free end of the hose disposed oppositely to the axially arranged preliminary blowing nozzle, a means, e.g., a spring-biased pair of battens, sealingly clamping the hose end and provided outside of the hollow mold is arranged, which may also be provided on the hose entrance side of the hollow mold around the preliminary blowing nozzle.

Instead of this spring-biased pair of battens, it is also possible to provide an integral pair of frames for the sealing clamping of the starting product or also a multi-part frame, the parts of which are removable in different directions to the axis of the calibrated pin.

During the practical realization of the method of the present invention, the preferably hose-shaped starting product is extruded by means of a nozzle of a press, for instance in its plastic state and is moved between a multi-part mold. This multi-part hollow mold may have at its free axial ends or at both ends means, such as spring-biased battens, which close both hose ends prior to the closing of the blowing mold. A bore is provided in halves in a pair of battens, in which a blowing pin is inserted prior to its closing, through which blowing pin the pressure medium is fed after closing of the hose by the battens. The hose starting product is widened to the approximate final shape and then the actual blowing mold is closed completely. By this arrangement, the material extending beyond the actual mold is squeezed off in a known manner and welded together, so that one or a plurality of hollow bodies are formed, which, however, do not have an opening.

An opening forming pin is now inserted through an opening provided in the wall of the mold. This pin has a hollow, needle-shaped point, which pierces the widened hose-shaped starting product and feeds therethrough an additional pressure medium into the hollow space. This pin forming the hollow needle opening is widened conically to the diameter of the desired opening, and is inserted further into the hollow space. The opening is widened by the pressure medium which flows from the inside, between the pin and the still plastic material, outwardly, so that a calibrated opening is created. This pin can be shaped such, as is conventional in connection with the manufacture of bottle-neck openings, and the superfluous material is punched away by the axial movement of the pin or the material is upset together by means of an additional sleeve.

In this manner, an opening can be formed at any point in a blowing body, which opening is ready for use upon opening of the mold. Thus, for instance in case of a canister, the airing opening can be provided outside of the mold division without additional work. In this case the hose need not be closed by spring-biased strips. The feeding of the pressure medium takes place through the filling opening. The same applies to the production of, for instance, raw fittings of all kinds, for instance of cross members, T-pieces, branches and the like.

With these and other objects in view, which will become apparent in the following detailed description, the present invention will be clearly understood in connection with the accompanying drawings, in which:

FIGURE 1 is a schematic elevation, partly in section, indicating the mold division of a blow mold with a plurality of ampulla-shaped inserts;

FIG. 2 is a section along the lines 2—2 of FIG. 1;

FIG. 3 is a vertical section along the lines 3—3 of FIG. 1, however, shown in a plane turned by an angle of 90°;

FIG. 4 is a fragmentary section of the mold, disclosed at an enlarged scale, shown in its closed position and inserted calibrating pin;

Figure 5:
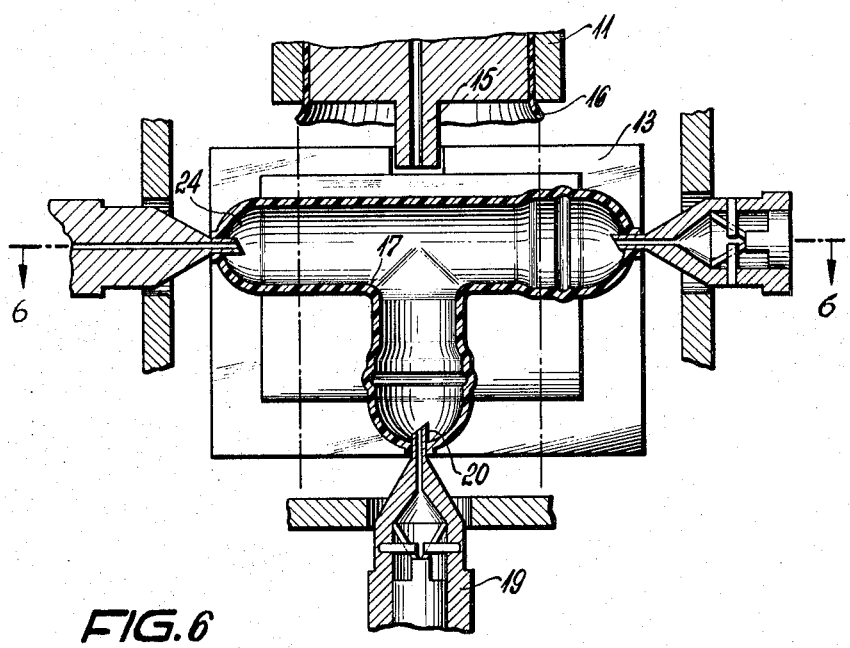
FIG. 5 is a vertical section of a pipe fitting, to indicate an application of the showing in FIG. 1.

Referring now to the drawings, and in particular to FIGS. 1 to 4, a hose nozzle 11 is disclosed from which the plastic hose-shaped starting product 16 emerges. When the working is not performed with heat, the nozzle 11 includes a heating chamber, from which the re-heated pipe emerges downwardly as a plastic hose and enters between the divided mold 12, which is surrounded on both sides by strips or by a closed frame 13. These strips or the frame are movable in the direction of movement of the mold. During the open position of the mold these strips or frames project by the force of springs 14 (FIGS. 2 and 3) beyond the closing faces of the mold depending upon the size of the hollow body to be blown up. Upon closing of the mold, these strips or frames close up the hose in the downward direction and under certain circumstances also at the top. A base is provided in the upper strip 13a for a pre-blowing pin 15 and the hose-shaped starting product 16 is widened to the approximate size and width, respectively, of the hollow body to be produced, so that it comes nearly to engagement on the lateral strip 13b. A further strip can also be provided on the opposite side. During the further closing movement of the mold, the hose is clamped and welded together about the hollow body 18 to be blown up by means of the cutting edges 17. The air present in the hose-shaped starting product prevents the hose parts from adhering together, and the mold is filled by simply and completely forming the hollow body without opening.

Now, the lateral blowing and calibrating pin 19 is put into motion in the direction of the blowing part. The hose and the hollow body, respectively, are pierced at the neck opening and a pressure medium is blown into the hollow body by means of a mechanical valve in response to the path through the blowing and calibrating pin 19. Due to the pressure above atmospheric pressure in the blowing body and the smaller diameter of the pin 20, relative to the neck diameter 21, the material closing the neck opening is widened, so that the calibrated pin does not move this material 22, as shown in FIG. 4, into the hollow body, but rather it is pressed toward the neck wall and separates the waste material by the edge 23 from the blowing body.

The upper spring-biased strip 13a is not absolutely necessary. It is important, however, that the air medium and the pressure medium, respectively, are pressed into the hose, closed by the lower strip 13, through the hose nozzle 11, so that the hose-shaped starting product widens to the approximate size of the blowing part. It is of course also possible to proceed in the opposite manner.

Figure 6:
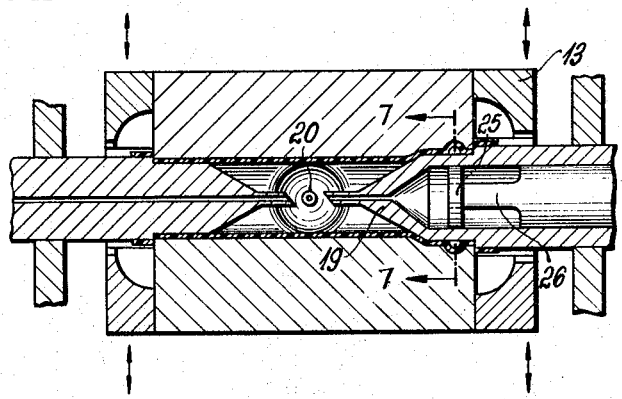
FIG. 6 is a horizontal section along the lines 6—6 of FIG. 5.
Figure 7:
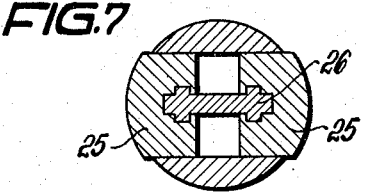
FIG. 7 is a section along the lines 7—7 of FIG. 6.

Referring now to FIGS. 5–7, for the manufacture of a T-fitting, a lower hollow needle 20 projects into the half-ball-shaped recess in the frame 13, so that during the preliminary blowing of the hose-shaped starting product, the latter is pierced at these points. The preliminary blowing takes place through the preliminary blowing pin 11 or through the lower hollow needle 20, so that the hollow space, which is defined by the two frames 13 is substantially filled out by the preliminary blowing body. During the continued closing movement, the half-ball-shaped recesses 24 are also filled out and pierced by the hollow needle 20. Upon termination of the closing movement, the plastic material is welded together and separated by the squeezing edges 17. Upon termination of the closing movement or shortly before, the frame 13 is withdrawn at both sides by a mechanical movement, for instance by means of a hydraulic or pressurized air cylinder, which replaces the springs 14 of the previously described embodiment. Accordingly, the still plastic half balls 24 lose their support in the mold. Under certain circumstances, the frame 13 can consist of a plurality of parts which can be moved away from the calibrating pin axis in different directions. Due to the inner pressure, which is maintained now by the hollow needles 20, the opening formed by the hollow needles is further widened, and the calibrating pin 19 can be inserted into the fitting, without sliding the waste material into the hollow body. The waste material is likewise separated from the blowing part, for example, as shown in FIG. 4. In this manner, a finished fitting ready for use is obtained.

One portion of the fittings is equipped with an edge flange, in which a circular cord is inserted for the sealing of the joint (not shown). This edge flange blows itself up without difficulty up to the squeeze-seam. At this point, the groove would normally not be clean without additional work. In order to save this additional work, as is shown in FIG. 6, a calibrated slide pair 25 is inserted in the blowing pin 19 in a cross-break, which calibrated slide pair 25 is operated in conventional manner by means of a spreading wedge 26, so that these flange fittings can also be blown into a finished product ready for use.

To perform the process, the movements of the parts of the apparatus can be performed manually, as well as mechanically and even, preferably, automatically. It is to be understood that the shown and described embodiments constitute merely examples for the realization of the present invention, which are within the scope of the present invention, which are, however, by no means limited thereto and other embodiments and applications are possible within the scope of the invention.

While we have disclosed several embodiments of the present invention, it is to be understood that these embodiments are given by example only and not in a limiting sense, the scope of the present invention being determined by the objects and the claim.

We claim:

A method of producing hollow bodies in a blowing process from hose-shaped starting products, wherein the longitudinal axis of the hose-shaped starting product deviates from the axis of the opening of the hollow bodies to be produced, comprising the steps of sealing, in a first step, a hose-shaped starting product about a blowing nozzle and blowing up the starting product therewith to form a partly blown up intermediate hollow body in a mold while the mold is not in its completely closed position, closing said mold completely in a second step, piercing said partly blown-up intermediate hollow body in a direction crosswise to the longitudinal axis of said hose-shaped starting product to form an opening in said intermediate hollow body, and feeding a pressure medium through said opening to blow up said intermediate hollow body to a finished hollow body and displacing and widening said hose-shaped starting product outwardly due to the pressure above atmospheric pressure within the range of the point of piercing, thereby creating an enlarged neck opening crosswise to said longitudinal axis at the region of piercing and calibrating said enlarged neck opening.

References Cited by the Examiner

UNITED STATES PATENTS

| | | | |
|---|---|---|---|
| 3,089,185 | 5/1963 | Di Settembrini | 264—98 |
| 3,198,861 | 8/1965 | Marvel | 264—98 |

FOREIGN PATENTS 591,405   4/1959   Italy.

ROBERT F. WHITE, *Primary Examiner.*

A. R. NOE, *Assistant Examiner.*